Aug. 23, 1955  A. K. VAN NEST  2,715,974
ELEVATOR ATTACHMENT FOR VEHICLES
Filed Jan. 6, 1953  3 Sheets-Sheet 2

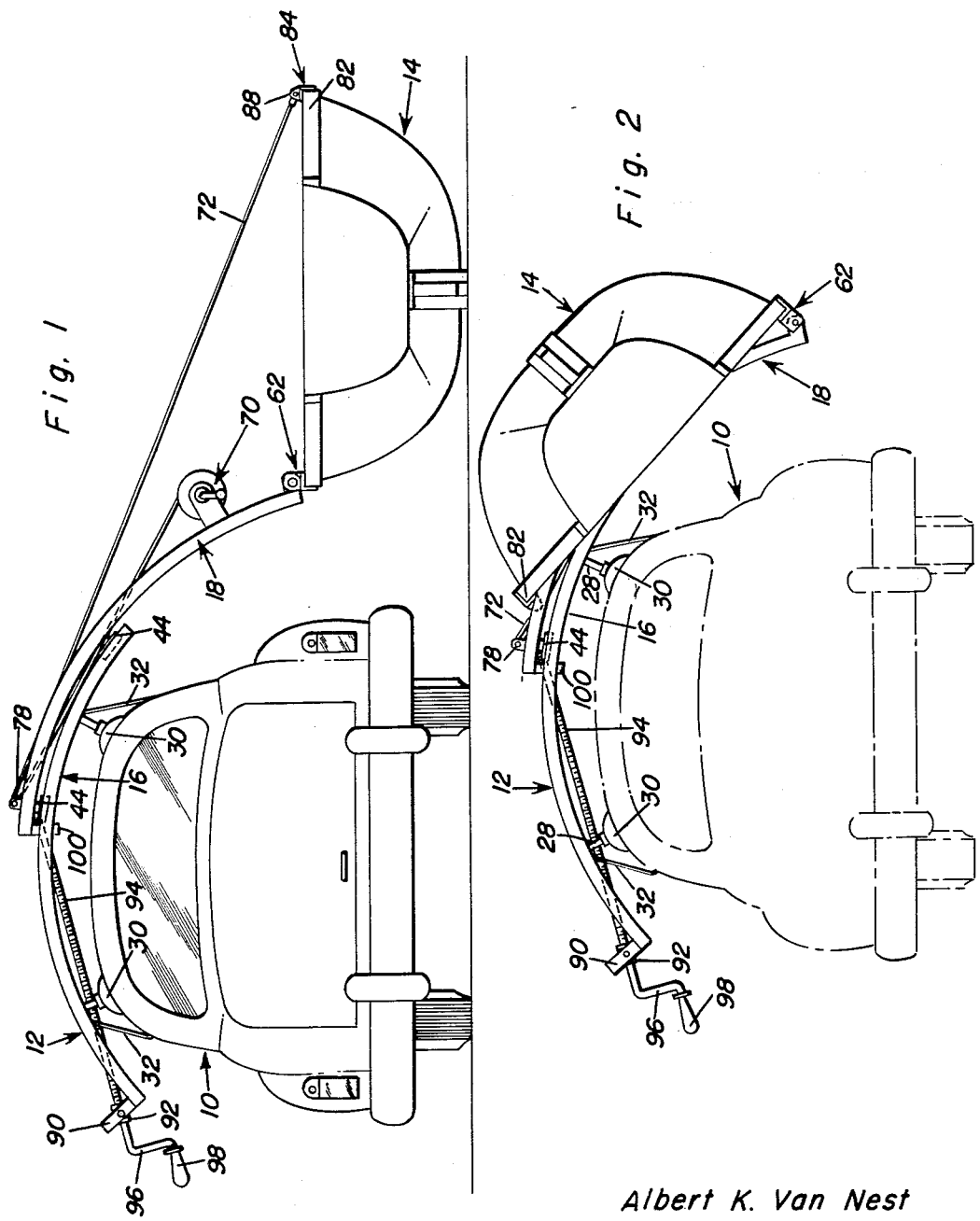

Albert K. Van Nest
INVENTOR.

Aug. 23, 1955  A. K. VAN NEST  2,715,974
ELEVATOR ATTACHMENT FOR VEHICLES
Filed Jan. 6, 1953  3 Sheets-Sheet 3

Albert K. Van Nest
INVENTOR.

United States Patent Office 2,715,974
Patented Aug. 23, 1955

2,715,974

ELEVATOR ATTACHMENT FOR VEHICLES

Albert K. Van Nest, La Mesa, Calif.

Application January 6, 1953, Serial No. 329,780

7 Claims. (Cl. 214—450)

This invention relates in general to hoist means, and more specifically to an elevator for hoisting a boat to a position of rest above a vehicle.

At the present time there are many persons desirous of owning small boats which they may utilize at the seashore and lake but hesitate to do so because of the inconvenience of transporting or storing their boat. It is therefore the primary object of this invention to provide an improved boat elevator which may be mounted upon a vehicle, such as the family car, and which may be utilized for elevating a boat from a position on the ground alongside the vehicle to a position at rest on top of the vehicle.

Another object of this invention is to provide an improved boat elevator which includes a supporting frame adapted to be carried by the roof of a vehicle, said supporting frame having associated therewith a carriage on which a boat is adapted to be mounted, said carriage being movable from a generally vertical position to a horizontal position overlying the supporting frame and roof of the vehicle.

A further object of this invention is to provide an improved boat elevator for raising a boat to a position resting on top of a vehicle, said boat elevator being of a relatively simple construction and formed of readily obtainable materials whereby the same is economically feasible.

A still further object of this invention is to provide an improved boat elevator which is relatively light weight and which is provided with relatively simple connecting means whereby the same may be quickly and easily secured to the roof of a vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear elevational view of a vehicle having mounted on the roof thereof the boat elevator which is the subject of this invention, the boat elevator being in a position immediately after a boat has been attached thereto to be elevated;

Figure 2 is a rear elevational view similar to Figure 1 and shows the boat in a partially elevated position, the vehicle being shown by dotted lines for purposes of clarity;

Figure 3 is a rear elevational view of the vehicle of Figure 2 and shows the boat in its elevated position resting upon the top of a vehicle;

Figure 5:
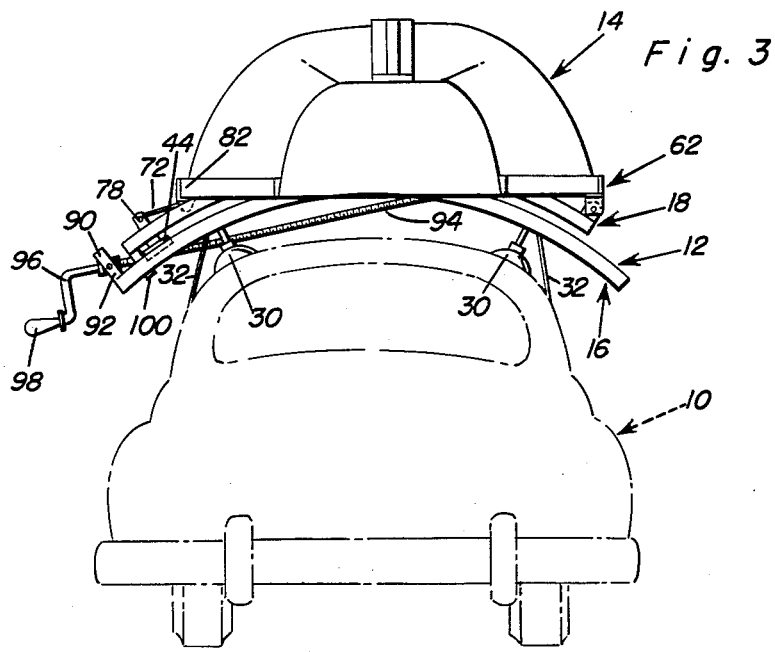
Figure 6:
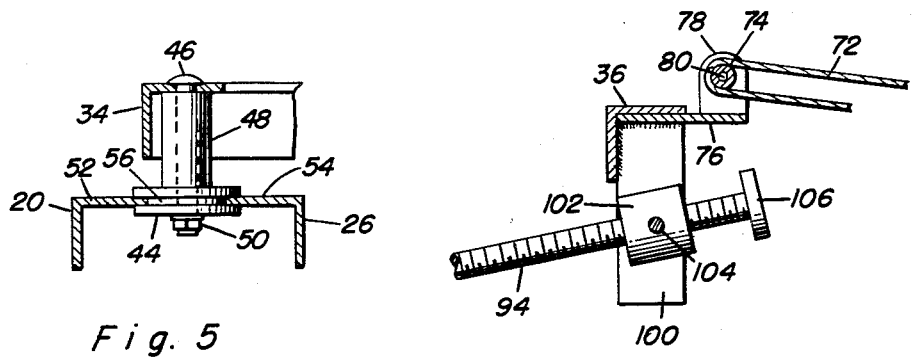
Figure 4:
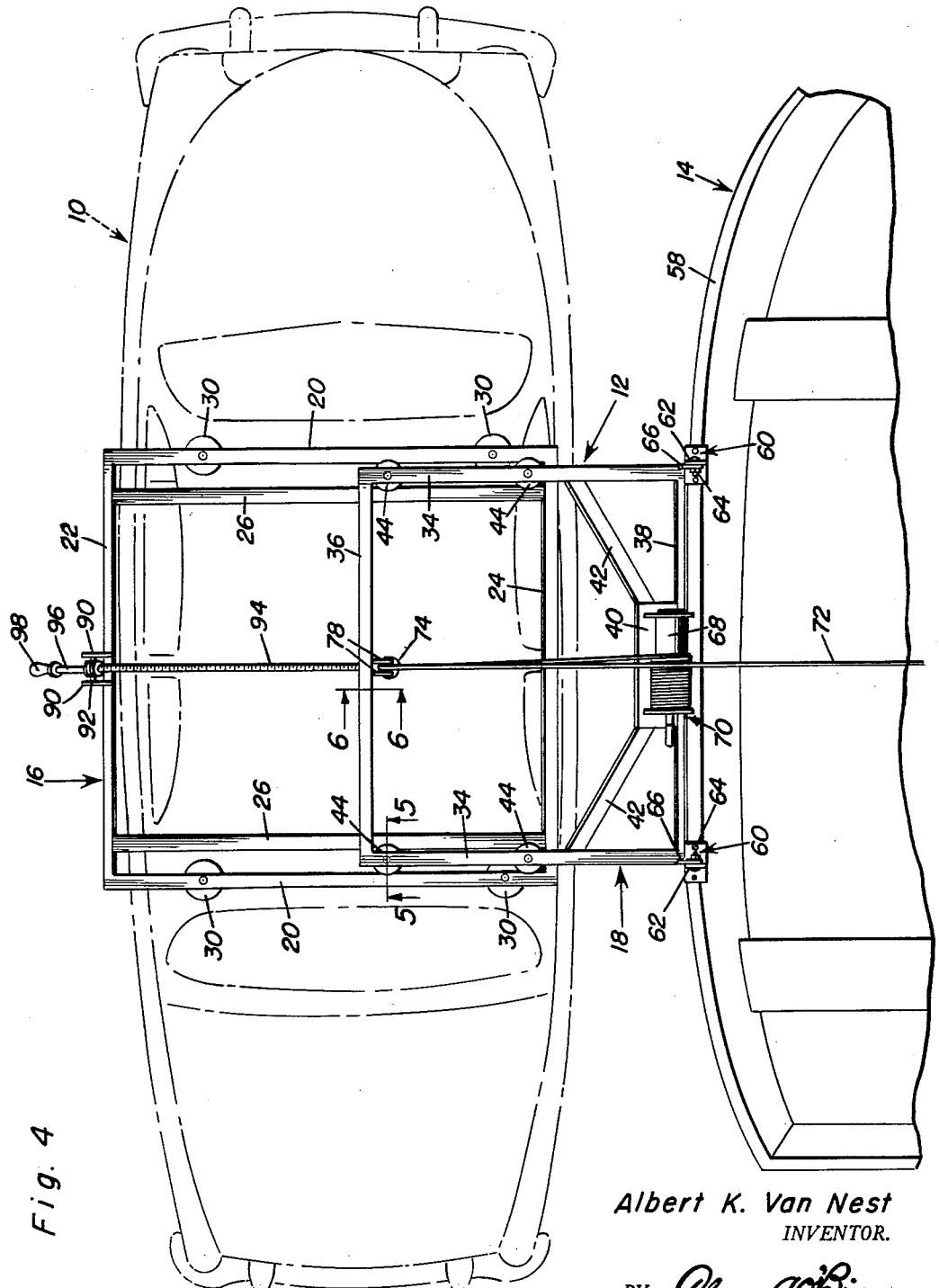
Figure 4 is a fragmentary top plan view of the vehicle and boat of Figure 1 and shows the general outline and construction of the boat elevator and its relationship to the vehicle, the vehicle being shown in dotted lines.

Figure 5 is an enlarged fragmentary transverse sectional view taken substantially upon the plane indicated by the section line 5—5 of Figure 4 and shows the details of a trackway carried by a supporting frame of the boat elevator and the relationship of a wheel of the carriage of the boat elevator with respect to the trackway; and, Figure 6 is an enlarged sectional view taken substantially upon the plane indicated by the section line 6—6 of Figure 4 and shows the manner in which means for elevating the carriage is attached to one edge of the same.

Referring now to the drawings in detail, it will be seen that there is illustrated in Figures 1 through 4, inclusive, a conventional vehicle in the form of a sedan 10. The sedan 10 has mounted thereon a boat elevator, which is referred to in general by the reference numeral 12, for elevating a boat 14 from a position at rest on the ground adjacent the sedan 10 to a position overlying the top of the sedan.

The boat elevator 12 includes a supporting frame, which is referred to in general by the reference numeral 16 which is transversely curved and is secured to the top of the sedan 10. The boat elevator 12 also includes a carriage, which is referred to in general by the reference numeral 18, the carriage being adapted to be secured to the boat 14 in supporting relation. The carriage 18 is detachably carried by the supporting frame 16 and is also transversely curved.

Referring now to Figure 4 in particular, it will be seen that the supporting frame 16 includes a pair of spaced parallel transverse frame members 20 which are secured together at one end by a longitudinal frame member 22 and at the other end by a longitudinal frame member 24. The supporting frame 16 also includes intermediate transverse frame members 26 which are disposed closely adjacent the transverse frame members 20 and are in spaced parallel relation thereto.

In order that the supporting frame 16 may be removably secured to the top of the sedan 10, there is secured to the undersides of the transverse frame members 20 downwardly projecting support rods 28 which have secured to the lower ends thereof downwardly open suction cups 30. The suction cups 30 directly engage the roof of the sedan 10 and are adapted to retain the supporting frame 16 in spaced relation thereto.

The supporting frame 16 is also retained on the top of the sedan 10 by downwardly projecting straps 32 carried by the transverse frame members 20. The straps 32 may be provided with hooks at their lower ends for engaging with either the windows or a drip molding (not shown) of the sedan 10. If desired, the straps 32 may be adjustable in length.

Referring now to Figure 4 in particular, it will be seen that the carriage 18 includes a pair of spaced parallel transverse frame members 34 which are secured together at one end by a longitudinal frame member 36 and at the other end by a longitudinal frame member 38. Carried by the longitudinal frame member 38 and disposed in general plane of the carriage 18 is a supporting plate 40 which is braced by a pair of diagonal frame members 42.

Referring now to Figures 4 and 5 in particular, it will be seen that carried by the transverse frame members 34 adjacent the longitudinal frame members 36 and adjacent their mid points are retaining guide wheels 44. The wheels 44 are secured to the transverse frame members 34, which are in the form of angle irons, by downwardly projecting fasteners 46. The wheels 44 are spaced from the transverse frame members 34 by elongated spacers 48 carried by the fasteners 46 and engaging the upper faces of the wheels 44. The wheels 44 may be retained on the lower ends of the fasteners 46 by adjustable nuts 50. The wheels 44 may be of the ball bearing type or may be provided with any other suitable bearings.

It will be noted that the transverse frame members 20 and 26 are also formed of angle iron and include aligned spaced upper flanges 52 and 54, respectively. The flanges 52 and 54 have adjacent edges thereof received in annular retaining guide wheels 44. In this manner the wheels 44 are guidingly retained within trackways formed by the transverse frame members 20 and 26.

Carried by a first gunwale 58 of the boat 14 is a pair of spaced mounting lugs which are generally T-shaped in outline, the mounting lugs being referred to by the reference numeral 60. Each mounting lug 60 includes an upstanding ear 62 which may be secured by a conventional fastener 64 to an upstanding ear 66 carried by the transverse frame members 34 at their points of intersections with the longitudinal frame member 38. It will be seen that the fastener 64 removably and pivotally connects the boat 14 to one side edge of the carriage 18.

Mounted on the supporting plate 40 is a reel 68 of a winch which is referred to in general by the reference numeral 70. Wound on the reel 68 is one end of a flexible member 72 which is passed over a roller 74 carried by the longitudinal frame member 36. As is best illustrated in Figure 6, an upper flange of the longitudinal frame member 36 has secured thereto a transversely and inwardly extending plate 76. Secured to the plate 76 and extending upwardly therefrom in spaced parallel relation is a pair of ears 78. Extending between the ears 78 is a pin 80 on which the roller 74 is mounted. It will be understood that the ears 78 retain the flexible member 72 on the roller 74.

Referring now to Figure 1 in particular, it will be seen that secured to a second gunwale 82 of the boat 14 is a centrally located T-shaped lug which is referred to in general by the reference numeral 84. Like the lugs 60, the lug 84 is provided with an upstanding ear 88. The ear 88 has removably associated therewith the other end of the flexible member 72.

Referring now to Figure 1 in particular, it will be seen that when it is desired to load the boat 14 on the sedan 10, the boat elevator 12 is disposed with the carriage 18 at one side of the supporting frame 16 and extending generally in a vertical plane. The lugs 60 of the boat 14 are attached to the ears 66 of the carriage 18 and the flexible member 72 is connected to the lug 84 of the boat while the boat rests on the ground in a generally upright position. Then through the use of the winch 70, the flexible member 72 is wound upon the reel 68 with the result that the boat 14 is tipped to an overturned position over top of the carriage 18 in a position best illustrated in Figure 2.

Carried by the longitudinal frame 22 of the supporting frame 16 at substantially the mid-point thereof is a pair of spaced parallel upstanding ears 90 between which is positioned and to which is pivotally connected a sleeve 92 having a longitudinal bore therethrough. Rotatably mounted in the sleeve 92 is one end of an elongated shaft 94 which has a major portion thereof externally threaded. The end of the threaded shaft 94 adjacent the sleeve 92 is in the form of a crank 96 which has a handle 98 mounted thereon to facilitate rotation of the shaft 94.

Referring now to Figures 4 and 6 in particular, it will be seen that secured to the underside of the longitudinal frame member 36 of the carriage 18 and projecting downwardly therefrom at substantially the mid-point thereof is a pair of spaced parallel ears 100. Positioned between the ears 100 and pivotally connected thereto is an internally threaded sleeve 102, the sleeve being connected to the ears 100 by pivot pins 104. The other end of the threaded shaft 94 is threadedly engaged within the sleeve 102 and is provided with a stop 106 to prevent removal of shaft from within the sleeve 102.

After the boat 14 has been tipped to the position illustrated in Figure 2, the handle 98 of the crank 96 is actuated to rotate the shaft 94. This results in the threading of the sleeve 102 onto the threaded shaft 94 and the movement of the sleeve 102 toward the sleeve 92. Movement of the sleeve 92 and 102 together results in the movement of the carriage 18 onto the supporting frame 16. Continuing rotation of the threaded shaft 94 results in the carriage and boat moving to a position overlying both the supporting frame and the sedan as is best illustrated in Figure 3. The boat 14 is then positioned for travel on the road to the owner's home or to the beach where the same may be unloaded by a reversal of the outlined steps.

While the elevator, which is the subject of this invention, has been specifically set forth as being utilized as a boat elevator for raising a boat from the ground to a position overlying the top of a vehicle, it will be understood that the invention is not so limited. For example, the elevator may be utilized in combination with racks in warehouses for storing heavy objects in elevated positions. Also, if desired, the specific construction of the supporting frame and the carriage may be varied to utilize other types of structure elements which may be readily obtained.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modification and equivalents may be resorted to, falling within the scope of the appended claims.

What is claimed as new is as follows:

1. An elevator for mounting a boat on a vehicle comprising a supporting frame, a trackway carried by said supporting frame, a carriage mounted on said trackway, means for securing a boat to said carriage, means for moving said carriage on said trackway, said first mentioned means including connectors for pivotally connecting one gunwale of a boat to one edge of said carriage, and means for rotating a boat to an inverted position overlying said carriage, said rotating means including a reel and a line, said line being adapted to be connected to a gunwale of a boat opposite said one gunwale.

2. An elevator for mounting a boat on a vehicle comprising a supporting frame, a trackway carried by said supporting frame, a carriage mounted on said trackway, means for securing a boat to said carriage, means for moving said carriage on said trackway, said first mentioned means including connectors for pivotally connecting one gunwale of a boat to one edge of said carriage, and means for rotating a boat to an inverted position overlying said carriage, said last mentioned means being carried by said supporting frame and being operatively connected to said frame.

3. An elevator for mounting a boat on a vehicle comprising an elevated support frame, an arcuate trackway carried by said support frame, an arcuate carriage conforming to the configuration of said trackway including an end portion having pivotal means thereon for engagement with the boat, means on said support frame in operable engagement with said carriage for moving said carriage along said trackway and into an elevated position, and force transmitting means carried by said carriage for engagement with said boat for positioning it in an inverted position on said carriage for elevation therewith.

4. An elevator as set forth in claim 3 wherein means are provided on said support frame for removable securement thereof on a support vehicle.

5. An elevator as set forth in claim 3 wherein said means on the support frame for moving the carriage along the trackway into an elevated position includes a manually operated screw member having one end pivotally supported on said support frame, the other end of which being pivotally connected to an end of the arcuate carriage.

6. An elevator as set forth in claim 5 wherein said force transmitting means includes a power operated winch for engagement with a portion of a boat to be raised in an elevated position.

7. An elevator comprising an elevated support frame, an arcuate trackway carried by said support frame, an arcuate carriage conforming to the curvature of said trackway reciprocably mounted on said trackway including an end portion operable to extend downwardly and engageable with the article to be raised from a lower support surface, said carriage being reciprocably supported for continuous movement in said trackway from a position wherein said one end portion is in relative proximity to an article being raised upon said support frame, means carried by said support frame for operable engagement with another end portion of said arcuate carriage for moving said carriage along the arcuate trackway, and means secured to said support frame for removably mounting said support frame in a raised position on a support surface.

References Cited in the file of this patent

UNITED STATES PATENTS

| 1,387,163 | Munzlinger | Aug. 9, 1921 |
| 2,180,032 | Casley | Nov. 14, 1939 |
| 2,229,483 | Toulmin, Jr. | Jan. 21, 1941 |
| 2,395,173 | Dobler | Feb. 19, 1946 |
| 2,486,316 | Morse et al. | Oct. 25, 1949 |
| 2,506,421 | Hacker et al. | May 2, 1950 |
| 2,551,351 | Swenson | May 1, 1951 |